United States Patent [19]

Jones et al.

[11] 4,067,298
[45] Jan. 10, 1978

[54] HAY BALE HAULER AND FEEDER

[75] Inventors: John B. Jones, Nashville; Robert W. Upton, Pulaski, both of Tenn.

[73] Assignee: Four Star, Inc., College Grove, Tenn.

[21] Appl. No.: 620,362

[22] Filed: Oct. 7, 1975

[51] Int. Cl.$^2$ ............................................. A01K 5/00
[52] U.S. Cl. ................................................... 119/60
[58] Field of Search .................. 119/60, 59, 58, 57, 119/56, 53, 52, 20, 27, 82; 296/6, 8, 11

[56] References Cited

U.S. PATENT DOCUMENTS

| | | | |
|---|---|---|---|
| 3,125,988 | 3/1964 | King | 119/20 |
| 3,336,908 | 8/1967 | Swanson | 119/60 |
| 3,502,366 | 3/1970 | Poleshook | 296/8 |
| 3,565,044 | 2/1971 | Sorrels | 119/53 |
| 3,834,353 | 9/1974 | Groezinger | 119/60 |
| 3,949,706 | 4/1976 | Coon, Jr. | 119/58 X |

Primary Examiner—Russell R. Kinsey
Assistant Examiner—Peter K. Skiff
Attorney, Agent, or Firm—Clarence A. O'Brien; Harvey B. Jacobson

[57] ABSTRACT

A hay hauler and feeder includes a platform of wood framed in steel with demountable racks which, when in place, serve as self-feeders, on sides, front and rear. Feeding stations are divided with steel bars angled to the right or left to limit and control hay withdrawal in order that the contents may be fed with minimum wastage. The hauler-feeder is mounted on a single axle mounting with four wheels in tandem which are capable of oscillation for maximum uniform weight distribution and a trailer jack at the front tongue for leveling when field-feeding.

1 Claim, 6 Drawing Figures

U.S. Patent    Jan. 10, 1978    Sheet 1 of 2    4,067,298
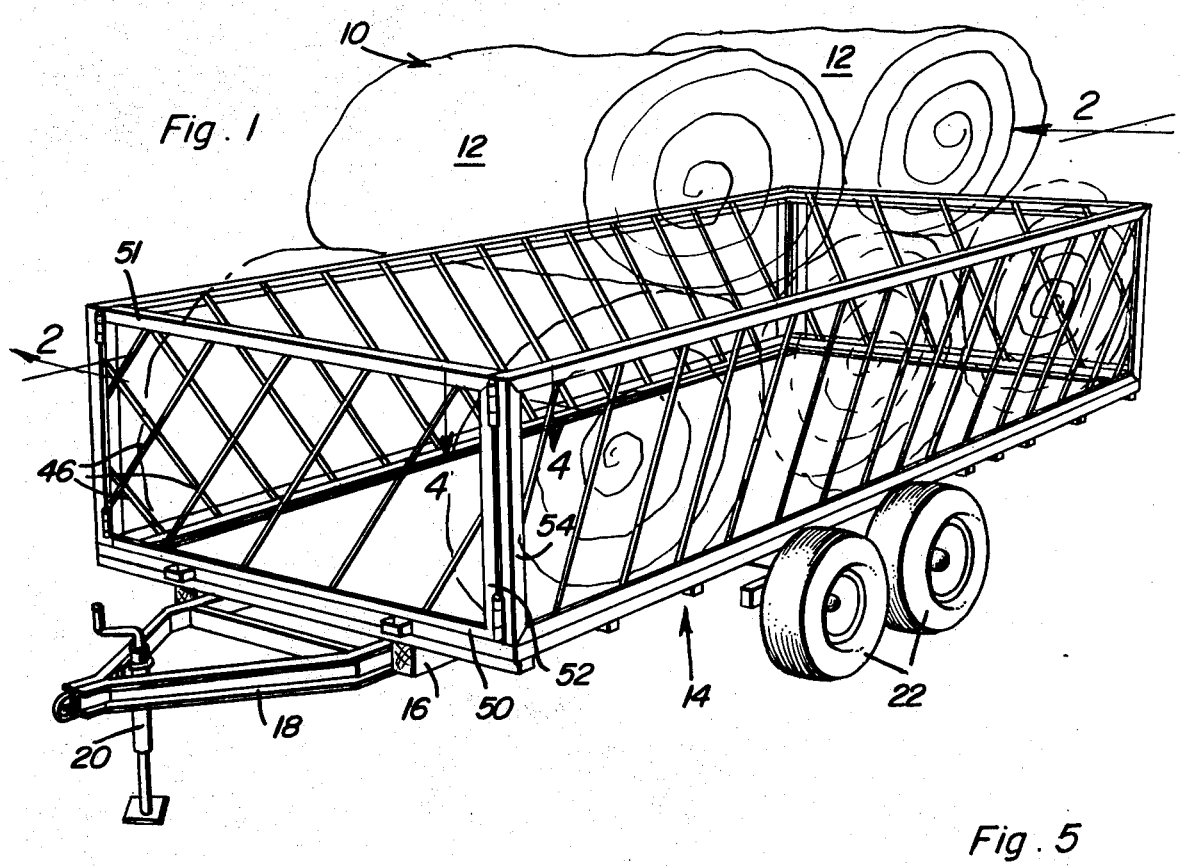
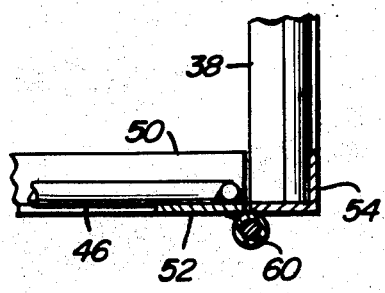
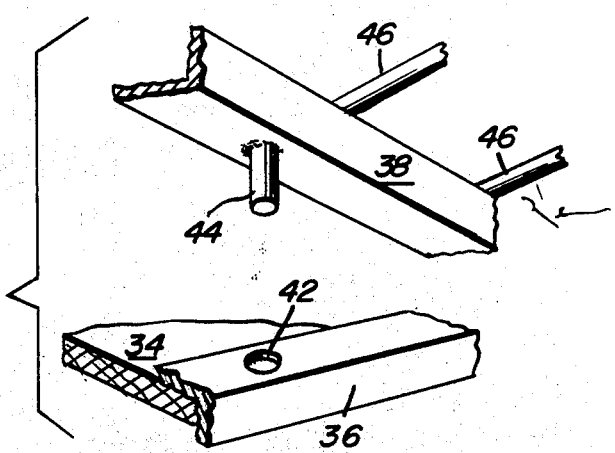
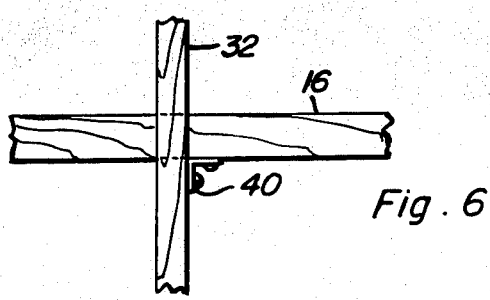

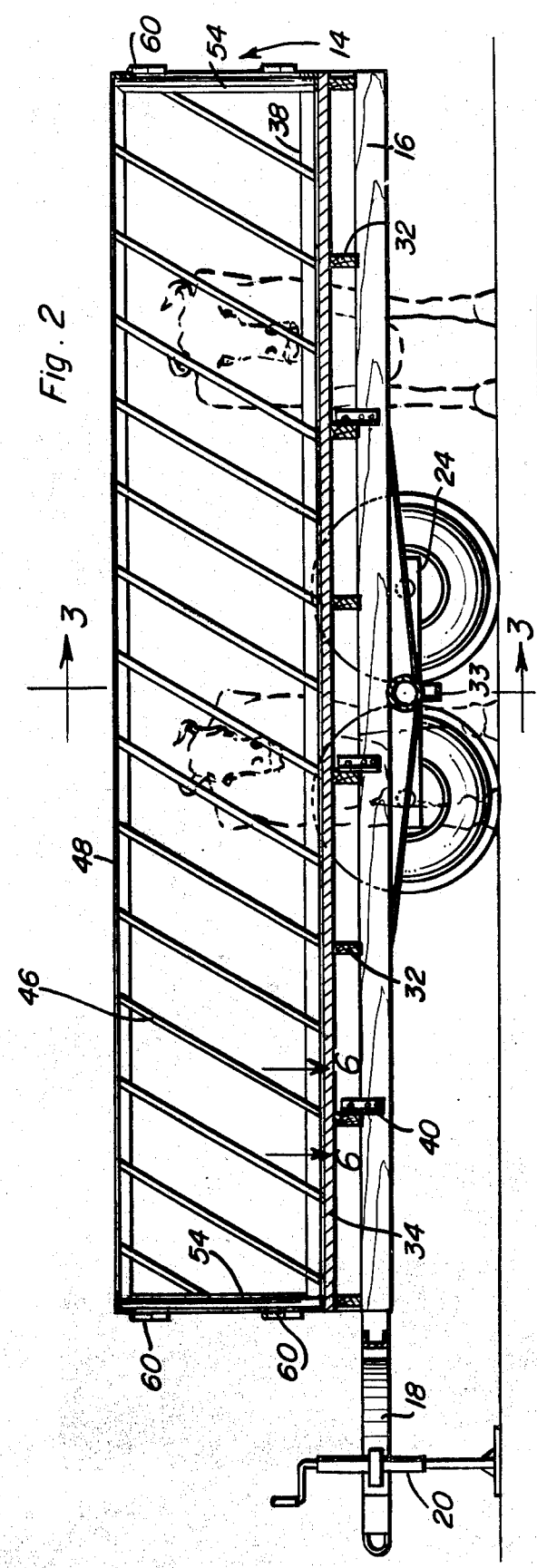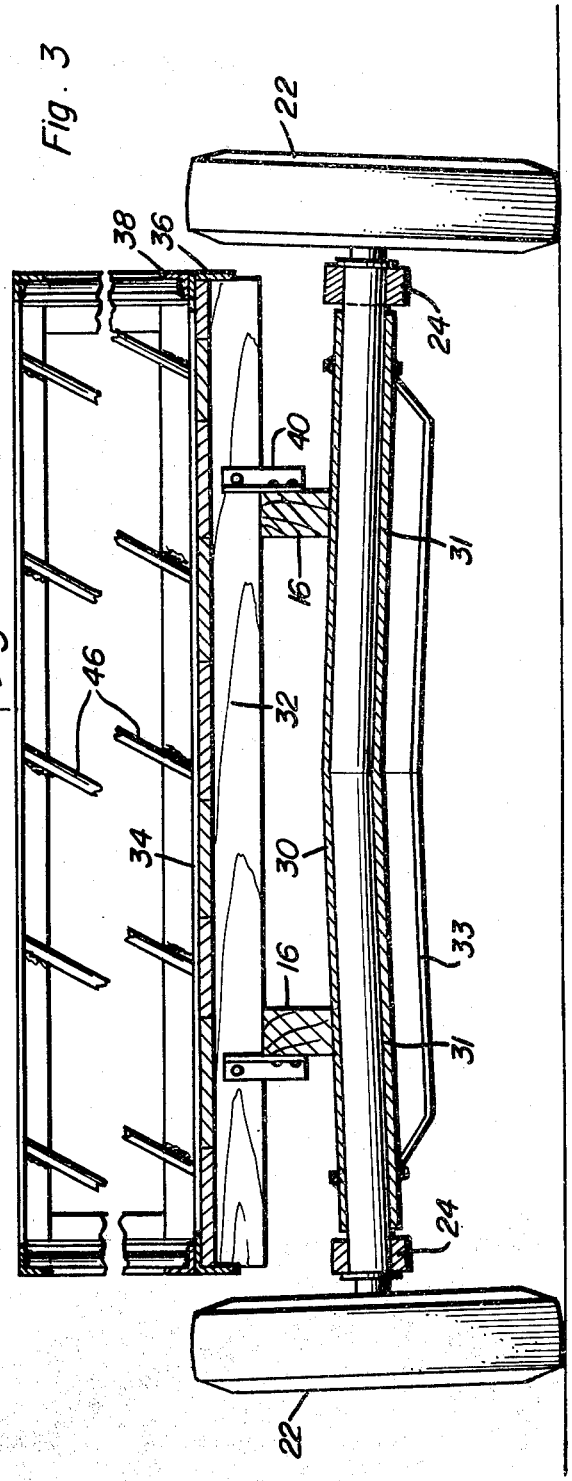

HAY BALE HAULER AND FEEDER

BACKGROUND OF THE INVENTION

1. Field of the Invention

This invention relates generally to a hauler wagon with feeding devices, and particularly to an easily transportable wagon platform having specific feeder structure mounted thereon. The feeder structure is so designed as to minimize hay wastage.

2. Description of the Prior Art

It has been a great problem on farms where large amounts of feed for cattle, etc. are used daily and weekly, in that a large amount of the hay is wasted. Also on modern farms hay bales are extremely large and heavy, weighing upwards of 1500 pounds. The known prior art is suitable for moving loose hay, or moving small hay bales, but nothing is known which is entirely suitable for both moving the extra large bales of present-day farms, and also providing feeder means for the cattle, or animals, to be fed.

Known prior art showing various types of hay racks and wagons can be found in the following patents: Whitaker, U.S. Pat. No. 272,109; Steeck, 558,003; Plomberg, 616,008; and Swan, 763,335. None of these wagons/hay racks are similar to the invention herein disclosed. Feeder devices are also known as taught by the patent to Schwartz, U.S. Pat. No. 390,259; and Deats, U.S. Pat. No. 3,777,713.

SUMMARY OF THE INVENTION

An object of the present invention is to provide a hauler and feeder device which is designed to haul large bales of hay to storage.

Another object of the present invention is to provide a device for easily feeding cattle which is readily transportable and once on site forms a stable feeding platform.

A further object of this invention is to provide a transportable feeder station which has unique feeding station means to reduce the wastage of the hay being used for feed.

These and other objects are achieved according to the present invention by providing a wagon having a platform of wood framed in steel with demountable racks which, when in place, serve as self-feeders, on the sides, front and rear. These racks form feeding stations which are divided with steel bars angled to the right or to the left to limit and control hay withdrawal in order that contents may be fed with minimum wastage, it being an established fact that livestock make best use of roughage when head withdrawal is impeded. This slant bar side, end, and front structure is one of the key features of this invention. In each group of cattle there is a natural boss or leader, once this leader has placed her head in the feeder the rest of the herd have no fear of her, to disengage her head she must twist her head to the side, roll her eyes and open her mouth. This fact of nature is utilized in this invention with the attendant savings in hay feeding.

Another feature of the feeder structure is that the slant bars are straight up and down insofar as the feeding position of the cattle is concerned, i.e. in the same vertical plane as the edges of the platform. Thus the cattle can assume a proper feeding position, the slant bars impeding the head withdrawal, with the accompanying saving in hay, but with the cattle in the proper position for easy feeding. The height of the wagon platform is also important to the proper feeding position.

In actual use the hauler and feeder device of this invention has fed up to 80 cows for a week at a time. the device will easily accommodate 5 large, heavy bales weighing up to 1500 pounds. It has been estimated that 10 bales fed from this device will be equal to 15 fed on the ground. The amount of waste in periods of inclement weather such as snow or rain, etc. is practically eliminated. A savings of one-third on the amount of hay normally fed by other methods is a tremendous practical and economical benefit.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing a hauler and feeder device according to the present invention.

FIG. 2 is a vertical sectional view taken generally along the line 2—2 of FIG. 1.

FIG. 3 is a fragmentary sectional view, front plan, taken generally along the line 3—3 of FIG. 2.

FIG. 4 is a fragmentary, partly in section, view taken generally along the line 4—4 of FIG. 1 showing the pin and socket connection for holding the racks together.

FIG. 5 is a fragmentary, perspective view, partly in section, showing a portion of the side rack and platform floor-engaging structure.

FIG. 6 is a fragmentary, sectional view, taken generally along the line 6—6 of FIG. 2 showing under-floor frame connection structure.

DESCRIPTION OF THE PREFERRED EMBODIMENT

Referring now to the drawings, the hauler and feeder device of this invention is shown generally by reference numeral 10. Hay bales 12 are shown (by light lines) loaded in their normal position in the hauler-feeder. Normally five large hay bales weighing upwards of 1500 pounds can be easily transported. Reference numeral 14 refers in general to the hauler-feeder structure.

The hauler-feeder of this invention includes generally a wagon which can be used for other purposes, and as an important addition thereto feeder racks easily mountable on said wagon for the purpose of converting the flat platform of the wagon into a movable feeder station. The wagon has main frame support beams 16 running from front to rear of same. Fastened at the front of these beams 16 is a tongue mechanism 18 having a leveling jack 20 as a part thereof. Any common tractor attachment coupling may be provided at the front of the tongue so that the hauler-feeder may be connected to any general hauling tractor. Firmly mounted on beams 16 along the entire length thereof are cross members 32 secured by angle brackets 40 to beams 16. FIG. 6 shows this feature in enlarged detailed. Beams 16 and cross members 32 are preferably made of wood and thus appropriate type fasteners would be attached between the brackets 40 and these wood members. Supported by cross members 32 is the floor planking 34. Again wood is used, oak being one of the recommended types, however any of the woods having reasonable strength may be used.

The basic platform as described above is mounted upon a single axle member 30, best seen in FIG. 3, by bracket means 31. A reinforcing angle iron 33 is normally also welded to the bracket means for additional strength. At each end of the axle are mounted oscillating arms 24. Each arm or walking beam 24 has wheel mounts attached at the respective ends thereof so that tandem wheels 22 may be mounted. This arrangement allows for greater stability of the wagon platform and also easier leveling of said platform about a transverse axis. It being important when the platform is being used as a feeder station, that the platform be relatively level. The tandem wheel mount as described above together with the leveling jack 20 allows the platform to be quickly leveled with maximum ease.

Along the outer upper edge of the platform angle irons 36 are firmly attached thereto. This angle iron is attached at both sides, and the front and the rear. At spaced intervals along the top side of the angle iron holes 42 are provided. These holes are for the reception of pins 44 which depend from the lower portions of the side feeder structure, and the rear and front feeder structures. These feeder structures include, in the case of the side members lower angle irons 38, upper angle iron members 48, and end angle iron members 54. These angle iron members are suitably welded at the corners thereof to form a rectangular side frame. Running along the side frame at an angle thereto are slanted steel bars 46 angled to the right or left as seen in FIGS. 1 and 2. These slanted bars are part of the unique feeder arrangement of this invention. The front and rear feeder stations are made in a manner similar to that of the side stations. that is, a lower angle member 50, an upper angle iron member 51, and side angle iron members 52 are suitably welded at the corners of same to form rectangular front and rear panel members. Again suitably slanted steel bars 46 are welded to the insides of these frame members.

Generally the device is about seven feet in width and approximately 18 feet in length with the slanting feeder bars being spaced approximately 16 inches apart. This spacing is adequate for normal size cattle and together with the slanted feature allows easy head entry on the part of the animal and yet offers enough restraint for head withdrawal to effect the feed saving which is one of the important objects of this invention.

FIG. 4 shows a simple pin-and-socket connector which may be used at the corners of the side, front and rear panels to strongly hold the panels together, and yet allow easy removal of same from each other and from the wagon platform.

FIG. 5 shows the pins 44 which retain the respective panels mounted on the wagon platform by means of spaced holes 42 in the angle irons 36 of the platform.

The device disclosed herein is relatively simple in construction and relatively easy to manufacture and maintain, however offering many unique features. The hauler-feeder can be loaded with five large, heavy bales of hay, moved by tractor power to a desired on-site feeding location, leveled by the leveling jack, and then the cattle permitted to feed through the unique feeder side panels. The efficiency of feeding together with the tremendous reduction in waste are important benefits from this invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A hauler and feeder adapted to receive a plurality of large cylindrical hay bales from a bale loading device, haul the bales to a feeding area and support the bales while cattle consume the hay, said hauler and feeder comprising a wheeled platform, tongue means connected to the platform to enable the hauler and feeder to be towed to a desired site, and a peripheral upstanding side member on said platform, said side member including a plurality of spaced, parallel bars with the space between the bars being sufficient to enable passage of the heads of cattle for access to the hay, said bars being slanted at a small angle from vertical to enable entry of the head with little restraint so that the bars are positioned alongside the neck of the cattle when feeding, said slanted bars engaging the upper poriton of the neck and adjacent portion of the rear of the head of cattle when the cattle raise their heads and move outwardly from a normal eating position adjacent the lower portion of the hay thus tending to retain the head of cattle inwardly of the bars when the cattle are chewing and swallowing thereby reducing hay loss caused by cattle pulling hay from the hay bales on the platform to a position outwardly of the periphery of the platform while feeding and dropping some hay from their mouths onto the ground, with the width of the platform being generally equal to the length of the hay bales oriented transversely of the platform whereby upper hay bales in a stack will lower toward the platform as the lower hay bales are consumed by the cattle, said platform being of rectangular configuration with the tongue means being disposed at only one end thereof, leveling jack means attached to said tongue means for supporting the tongue means when not attached to a towing vehicle for supporting the platform so that it is substantially level from end to end, said side member including parallel side portions and parallel end portions with the side portions and end portions being perpendicular to each other and rigid from end to end, means detachably supporting the side member from the platform to enable the side member to be removed for use of the platform as a utility trailer, said side member including a one-piece lower rail and a one-piece upper rail oriented in vertically spaced and aligned relation, the ends of the upper and lower rails being rigidly interconnected by vertical rails, means detachably connecting the ends of the side portions and end portions of the side member to enable assembly and disassembly of the portions of the side member, said wheeled platform including a tandem wheel assembly adjacent the center of the length of the platform, said tandem wheel assembly including a pair of tandem wheels at each side of the platform with the pair of wheels at each side of the platform being rotatably supported from a walking beam pivotally supported from the platform for rocking movement about a transverse axis to uniformly distribute the weight of the platform and hay bales to the tandem wheels, said means detachably connecting the side member to the platform including a plurality of depending pins rigid with the lower rail on each of the portions of the side member, said platform including a plurality of sockets removably receiving said pins, said lower rails being disposed against the platform and generally oriented in alignment with the outer upper edge of the tandem wheels whereby cattle can gain access to the hay by inserting their heads between any pair of adjacent bars throughout the periphery of the platform, said lower rails of the side member including an upwardly extending flange along the outer edge and throughtout the length therof for retaining hay.

* * * * *